United States Patent [19]

Imazeki et al.

[11] Patent Number: 4,570,160
[45] Date of Patent: Feb. 11, 1986

[54] SIGNAL ENCODING AND DECODING SYSTEM FOR DRIVING A REMOTE DISPLAY

[75] Inventors: Kazuyoshi Imazeki; Toshiyuki Tanaka; Fumio Hayashibara, all of Tokyo, Japan

[73] Assignee: General Research of Electronics, Inc., Tokyo, Japan

[21] Appl. No.: 471,893

[22] Filed: Mar. 3, 1983

[30] Foreign Application Priority Data

Apr. 12, 1982 [JP] Japan ................................. 57-61520

[51] Int. Cl.[4] ............................................. G09G 3/00
[52] U.S. Cl. ............................... 340/789; 340/825.77; 340/309.4; 340/717
[58] Field of Search ............ 340/802, 789, 717, 309.3, 340/309.4, 309.5, 825.56, 825.77; 368/46, 57, 82, 83, 107, 241, 10, 108

[56] References Cited

U.S. PATENT DOCUMENTS

| | | | |
|---|---|---|---|
| 3,320,585 | 5/1967 | Hines | 340/717 |
| 3,877,216 | 4/1975 | Mounce et al. | 340/309.4 |
| 3,932,714 | 1/1976 | Guimier et al. | 340/825.77 |
| 4,152,696 | 5/1979 | Smith | 340/825.77 |
| 4,364,655 | 12/1982 | Parker | 340/309.4 |
| 4,394,653 | 7/1983 | Breeze | 340/825.82 |

Primary Examiner—Gerald L. Brigance
Attorney, Agent, or Firm—Trexler, Bushnell & Wolters, Ltd.

[57] ABSTRACT

A system is provided for transmitting data from at least one control position to at least one remote display position over a plurality of transmission lines coupled between the control position and the display position. These transmission lines include a common power supply line, a ground line and a number M of conductors. Each conductor is used for transmitting one or more of a number N of different data. The display position includes a number R of display characters. The invention provides circuits for transmitting N data on M transmission lines to actuate a given combination of R display characters corresponding to each of the N data wherein both R and N are greater than M so that the transmission lines are fewer in number than either the number of data or the number of display characters.

5 Claims, 9 Drawing Figures

SIGNAL ENCODING AND DECODING SYSTEM FOR DRIVING A REMOTE DISPLAY

CROSS-REFERENCE TO RELATED APPLICATION

Reference is directed to our co-pending application, Ser. No. 471,891, filed Mar. 3, 1983, for a WAITING TIME DISPLAY SYSTEM, which discloses similar subject matter but claims a different invention from this application.

BACKGROUND OF THE INVENTION

This invention relates generally to signal transmitting systems and more particularly to a system for transmitting data from a control location to a remote display location using a minimum number of conductors.

Multiple character displays such as seven-segment alphanumeric displays are widely used. Such a display may comprise light-emitting diodes (LED), liquid crystal display segments (LCD) or any other multiple character or multiple segment type of display. While the invention is useful with any multiple character display, the disclosure will be facilitated by specific reference to seven-segment alphanumeric displays.

In such seven-segment displays, various alphabetic or numeric characters may be formed by selectively energizing appropriate combinations of the segments. Accordingly, in order to selectively energize any given combination of segments, seven separate transmission lines or conductors are generally required to separately energize and de-energize each of these seven segments, in addition to common positive voltage supply and common ground conductors. Hence, for a two-character alphanumeric display, at least sixteen independent data lines or conductors are needed, including the common voltage supply and ground lines. As the number of seven-segment display elements increases, the number of conductors required increases accordingly.

It will be apparent that the provision of cables and connectors for interconnecting such displays with remotely located control or data generating devices becomes complex and expensive as the number of conductors required increases. The prior art has heretofore attempted to decrease the number of conductors required by utilizing multiplexing and de-multiplexing and other serial to parallel and parallel to serial encoding and decoding techniques. However, such techniques generally require the use of relatively expensive integrated circuit components. Hence, in applications where a plurality of remote control or data generating stations must be coupled with a single centrally located display location, a corresponding plurality of expensive decoding and encoding integrated circuit components must be utilized.

OBJECTS AND SUMMARY OF THE INVENTION

Accordingly, it is a general object of the invention to provide a simple and inexpensive system for transmitting data from a plurality of control locations to a central display location while greatly reducing the number of conductors necessary to achieve this data transmission.

A more specific object is to provide a signal encoding and decoding system which utilizes relatively simple and inexpensive circuit components to minimize the number of conductors required for the data transmission.

A related object is to provide such a data transmission system which is relatively simple and inexpensive in its design and manufacture and yet highly reliable in operation.

Briefly and in accordance with the foregoing objects, a system for transmitting data from at least one control position to at least one remote display position comprises a plurality of transmission lines coupled between said control position and said display position. These transmission lines comprise a common power supply line, a ground line and a number M of conductors, each conductor for transmitting one of a number N of different data. The display position includes a number R of display characters. Means are provided for transmitting said N data on said M transmission lines to actuate one or ones of said R display characters corresponding to each of said N data wherein both R and N are greater than M so that said plurality of transmission lines is fewer in number than either said plurality of data or said plurality of display characters.

BRIEF DESCRIPTION OF THE DRAWINGS

The features of the present invention which are believed to be novel are set forth with particularity in the appended claims. The organization and manner of operation of the invention, together with further objects and advantages thereof, may best be understood by reference to the following description taken in connection with the accompanying drawings, in the several figures of which like reference numerals identify like elements, and in which:

DETAILED DESCRIPTION OF THE ILLUSTRATED EMBODIMENT

While the invention is useful in conjunction with transmission of data between control or data generating units and corresponding display units for a number of applications, the description will be facilitated by specific reference to the problem of providing a waiting time display system. Generally speaking, such a waiting time display system may be utilized at service or reception counters in banks, hotels, airport check-in counters or the like for monitoring the time required to serve each client or customer and consequently, the "waiting time" for customers waiting to be served. Hence, each service counter or reception desk is provided with a suitable control unit for generating data corresponding to an expected transaction time or "waiting time" at that desk before the next customer may be served. Preferably, each of these control units is also coupled to a central display at a remotely located supervisor's station or the like, whereby the clients or customers may be effectively guided or ushered to appropriate service desks with a minimum of waiting time.

Figure 1A:
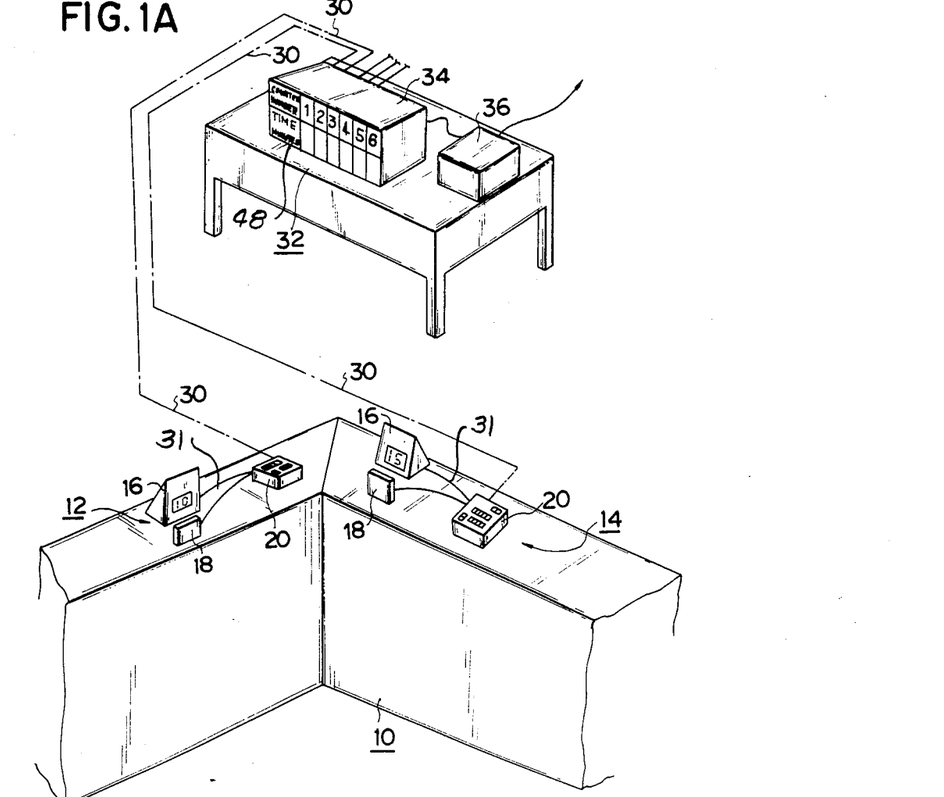
FIG. 1A is a perspective view of an exemplary display control system in which the present invention may be advantageously utilized.
Figure 1B:
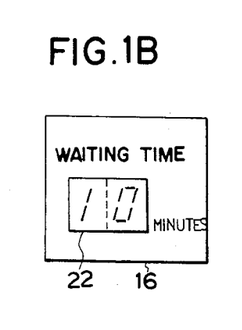
FIGS. 1B and 1C illustrate respectively the front panels of a display unit and of a control unit of the type generally illustrated in FIG. 1.

Referring now to FIG. 1, a waiting time display control system is here illustrated in conjunction with a counter 10 including two service areas or desks 12, 14. The invention may be readily utilized with a greater number of service desks or areas, only two such desks 12, 14 being here illustrated for facilitating the description. On each desk 12, 14 is provided a waiting time or transaction time indicating or display unit 16, which preferably is oriented to face the waiting customers. A control unit 20 is preferably oriented to face the clerk or receptionist. As shown in FIG. 1B, two characters or digits are included in the display portion 22 on a front panel of the time display unit 16 in order to indicate the waiting time or transaction time in minutes.

Figure 1C:
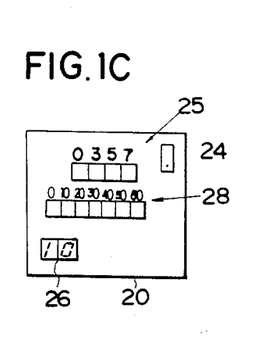

FIG. 1C illustrates a front panel control surface of the control unit 20 which includes a power supply on-off switch 24, a monitor display 26 and two sets of pushbutton switches 25 and 28. Preferably, the monitor display 26 is operated in unison with the display 22 so that the operator may keep track of what is displayed to the waiting customers or clients. The pushbutton switches 25 are four in number and labeled 0, 3, 5 and 7 to correspond to minutes in units, while the pushbutton switches 28 are labeled 10, 20, 30, 40, 50 and 60 to correspond to minutes in tens. Accordingly, operation of the pushbutton switches 25 displays either 0, 3, 5 or 7 minutes on the respective display characters 22 and 26, while operation of the pushbuttons 28 causes displays of 10, 20, 30, etc., minutes, respectively. An additional one of the pushbutton switches 28 is labeled 0 for use as a reset switch, that is to reset both displays 22, 26 to "00". From the foregoing, it will be apparent that operation of one of the switches 25 together with one of the switches 28 will result in a display in the characters 22 and 26 of 13, 15, 17, ... 63, 65, 67 minutes, respectively. In this regard, it is also possible to audibly indicate the waiting time either separately or together with the visual display thereof on the characters 22, 26 by using an audio or voice synthesizer unit 18.

Referring again to FIG. 1A, the waiting time or transaction time entered at each desk or station 12, 14 as described above is also supplied to a central monitoring unit 34. This monitoring unit 34 may be located at a supervisory or control desk or station 32 and receives the time data by way of suitable multiple conductor cables 30, 30. Hence, a supervisor or other person at the control station or desk 32 may observe the waiting time or transaction time received on the cables 30 on a display 34 with respect to each of the reception desks or service areas 12, 14 and use this information to guide or usher the waiting customers or clients. The signals from the audio units or voice synthesizers 18 may also be applied to the central control or monitoring unit 34 by way of the cables 30. Similar cables 31 transmit this same data from each control unit 20 to its associated display unit 16. Additionally, the data fed to the centralized control unit 34 may also be recorded for later analysis at another location. To this end, a suitable transmission device such as a modem 36 is illustrated interconnected between the control unit 34 in a suitable remote recording unit (not shown).

Figure 2:
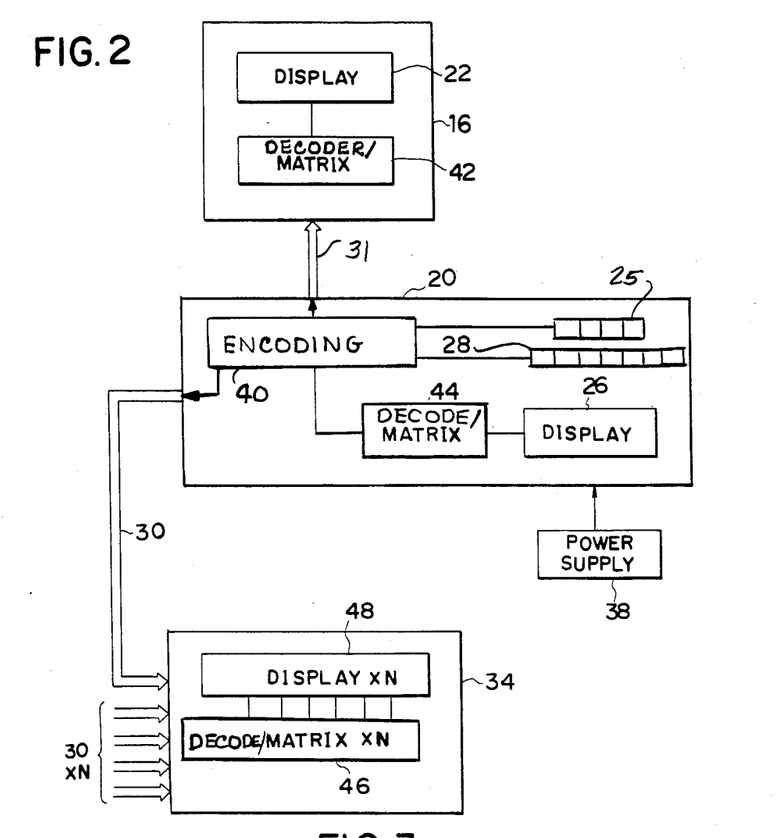
FIG. 2 is a block diagram of the circuits associated with the system of FIG. 1A.

Referring now to FIG. 2, a circuit diagram in block form indicates the functional elements of the system of FIG. 1A thus far described. Briefly, in order to minimize the number of conductors or lines which must be fed out by way of the cables 30 and 31 suitable encoding and decoding is carried out within the respective units 16, 20 and 34 which are interconnected by these cables 30 and 31.

In this regard, each of the control units 20 includes an encoding unit 40 which is coupled with the respective keyboards or pushbutton switches 25 and 28. This encoding unit 20 functions to encode the depressed ones of the keys 25 and 28 onto a respective one or ones of the conductors forming the cables 30, 31. Additionally, this encoder 40 feeds the encoded signals representing the depressed pushbuttons 25 and/or 28 to a decode/matrix 44 which drives the monitor display 26 of that control unit 20. A suitable power supply 38 is also provided for all of the units 16, 20 and 34. In this regard, similar cables 30 are here illustrated feeding the central monitoring and control unit 34 from other similar control units 20 located at additional desks or service areas 12, 14, etc.

The transmission lines or conductors 30 and 31 feed into a pair of similar decode/matrix circuits 42, 46 provided respectively in the display unit 16 and centralized monitoring and control unit 34. In this regard, it will be noted that a number N of these matrix circuits 46 corresponding in number to the number N of cables 30 and hence of reception desks or stations 12, 14, etc., are provided in the centralized unit 34. Additionally, a separate display 48 is associated with each of these N matrices 46, cables 30 and reception desks or stations 12, 14 etc. The display portion 22 of each display unit 16 is of course fed by its associated decode/matrix circuit 42, which functions to decode the encoded signals on the associated transmission lines or conductors 31.

The encoding and decoding utilized in accordance with the present invention comprises a DC voltage level encoding and decoding arrangement. This arrangement will be best understood by reference to the concepts to be explained now with reference to FIGS. 3, 4A and 4B.

Figure 3:
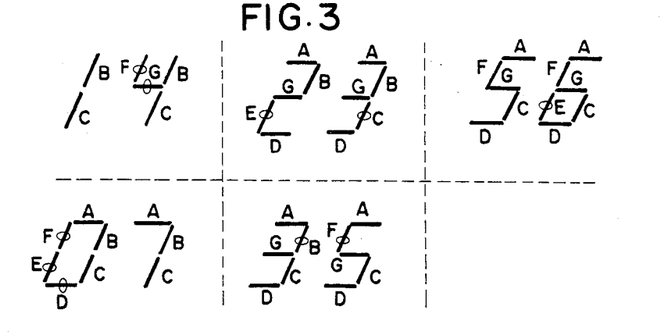
FIG. 3 shows a number of seven-segment alphanumeric display characters illustrating one aspect of the operation of the invention.

Referring initially to FIG. 3, a number of numeric characters or digits are illustrated as they appear when reproduced by a conventional seven-segment alphanumeric display. In this regard, the respective segments of such a display are generally designated, starting with the topmost segment and moving in a clockwise direction, by letters of the alphabet A, B, C, D, E and F, with the central segment being designated by the letter G. This convention of segment designation will be utilized hereinafter. FIG. 3 illustrates a simplified concept of encoding two different digits onto a single conductor. This concept involves selecting two digits which utilize a maximum number of the segments A, B, C, etc., of a conventional seven-segment display in common.

Hence, the first set of digits 1 and 4 both utilize in common segments B and C, while the digit 4 additionally utilizes segments F and G as indicated by small circles. Accordingly, when the segments B and C have been energized to form the numeral 1, only additional segments F and G need be added to display the digit 4.

In similar fashion, digits 2 and 3 both utilize segments A, B, D and G. To form the digit 2, the additional segment E must be energized while to form the numeral 3 the additional segment C must be energized and these segments are respectively indicated by circles in FIG. 3. Similar considerations are illustrated in FIG. 3 with respect to digits 5 and 6 which have all but the segment E in common, and for the digits 0 and 7 which have all but segments D, E and F in common, and for the digits 3 and 5 which have all but segments B (for the digit 3) and F (for the digit 5) in common.

In accordance with the theory illustrated in FIG. 3, a preferred form of the invention thus uses a first conductor or line to carry encoded signals for the digits 1 and 4, a second conductor for the digits 2 and 3, a third conductor for the digits 5 and 6, all associated with the tens pushbuttons 38. Similarly, the preferred embodiment as will described hereinbelow utilizes a single conductor for digits 0 and 7 and a second conductor for digits 3 and 5 corresponding to the units pushbuttons 25 described above. The foregoing is but one specific example of the principles of the invention, and other arrangements may be utilized without departing herefrom.

Figure 4A:
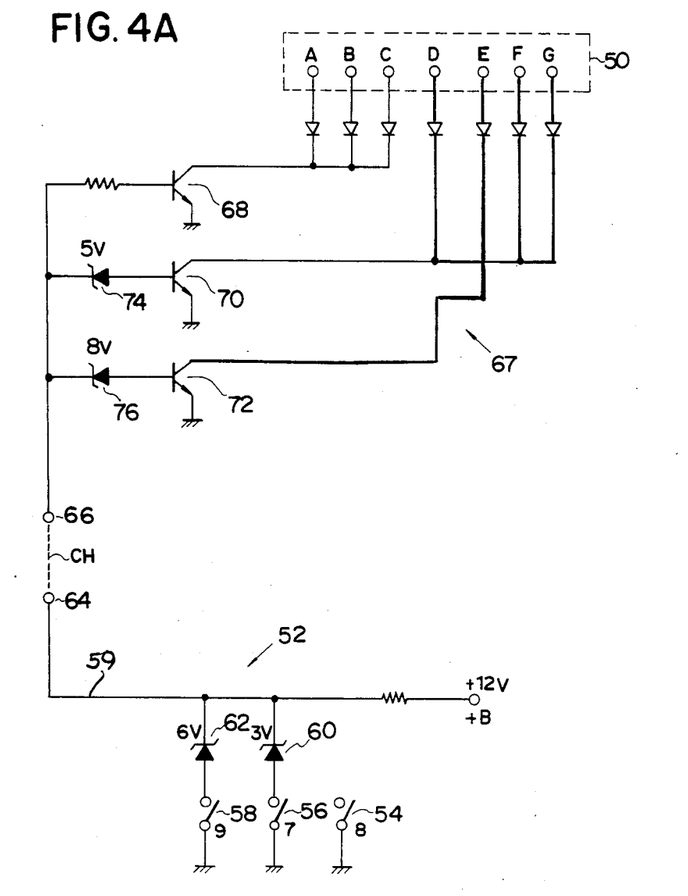
FIG. 4A is a simplified schematic circuit diagram which illustrates the operation of one aspect of the invention.
Figure 4B:
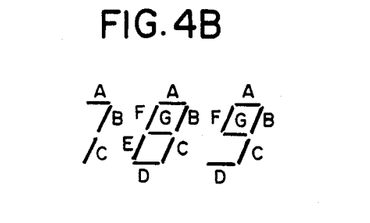
FIG. 4B shows a number of seven-segment alphanumeric display characters illustrating the operation of the circuit of FIG. 4A.

Referring now to FIG. 4A and 4B a simplified encoding and decoding scheme for producing DC level signals on a single line to represent as many as three data points, or in the present case digits, is illustrated. The circuit of FIG. 4A is with some modification in the illustrated embodiment, but it will be understood that other circuits performing the equivalent functions may be utilized without departing from the invention.

Referring now in detail to FIG. 4A, a seven-segment display 50 is here illustrated as a common-anode-type display comprising display elements or segments A through G, inclusive. These segments A through G correspond to the segments designated A through G in FIG. The same convention is also utilized to designate like segments in FIG. 4B to be discussed presently. This common-cathode-type display unit 50 is thus energized by the grounding of the associated display element inputs through suitable diodes 51 by suitable switching means.

In the illustrated embodiment, an encoding circuit 52 comprises three switches 54, 56 and 58 which are utilized to provide different potentials on a common line 59. This line 59 is fed from a suitable +B power supply which is here illustrated as +12 volts DC. The specific encoding and decoding illustrated in FIG. 4A is such that actuation of the switch 54 produces the digit 8 in the seven-segment display 50, actuation of the switch 56 produces the digit 7 and actuation of the switch 58 produces the digit 9. Hence these digits 7, 8 and 9 are indicated adjacent the respective switches 56, 54 and 58.

The common line 59 feeds an output terminal 64 which may be viewed as equivalent to the output of the control station unit 20 of FIGS. 1 and 2. A suitable transmission channel CH comprising but a single conductor couples this output terminal 64 with a suitable input terminal 66 which may be viewed as an input to either of the display units 16 or 34 illustrated and described above. Encoding of the digits 7, 8 and 9 is achieved by producing associated but different DC voltage levels on the conductor 52.

In this regard, the switch 54 is a dummy or inactive switch in the circuit of FIG. 4A whereby 12-volts DC is produced at the terminals 64 and 66 upon actuation thereof. The switch 56 is coupled to place a 3-volt zener reference or clamping diode 60 in circuit with 12 volt DC supply on the common line 59. Hence, the 12 volt supply is clamped to 3-volts DC at the terminal 64 and 66 when the switch 56 is actuated. Similarly, the switch 58 is coupled to place a 6-volt zener reference or clamping diode 62 in circuit with the line 59 whereby 6 volts DC appears at terminals 64 and 66 when this last switch 58 is actuated.

Referring now to the display 50, it will be seen that it is energized by a decode/matrix circuit designated generally by the reference numeral 67. The voltage levels produced as described above at the input terminal 66 of this circuit 67 are decoded to energize the base electrodes of one or more of three grounded emitter switching transistors 68, 70 and 72. The first of these transistors 68 has its collector electrode coupled with the cathode electrodes of three of the diodes 51 which form the matrix portion of the circuit 67. The anodes of these three diodes are coupled respectively with the A, B and C segments of the display 50. Similarly, the collector electrode of the transistor 70 is coupled with the cathode electrodes of three of the diodes 51 whose anodes are coupled respectively with the D, F and G segments of the display 50. In like fashion, the collector electrode of the transistor 72 is coupled with the cathode of the remaining diode 51, the anode of which is coupled with the E segment of the display 50.

Reference is now also invited to FIG. 4B, wherein the respective groups segments energized to form the respective digits 7, 8 and 9 are illustrated. Initially, it will be seen that the segments A, B and C are utilized in all three of these digits. Accordingly, the base electrode of the transistor 68 is coupled by way of a suitable current limiting resistor 69 to the terminal 66, whereby this transistor 68 and the associated segments A, B and C will be energized without regard to which of the switches 54, 56 and 58 is actuated. The collector electrode of the transistor 70 is provided with a 5-volt (breakdown voltage) zener diode 54 coupled in series with the input terminal 66. Similarly, the base electrode of the transistor 72 is provided with an 8-volt (breakdown voltage) zener diode 76 coupled to the input terminal 66. In operation, when the switch 54 is closed the full 12-volt DC power supply voltage is produced at the input terminal 66 energizing all three transistors 68, 70 and 72 and thus energizing all seven segments of the display 50 to form the numeral 8 as illustrated in FIG. 4B. However, when the switch 56 is closed, a 3-volt DC signal is produced at the input terminal 66 which is a sufficient voltage level to energize only the transistor 68, thus energizing the segments A, B and C to form the digit 7 as illustrated in FIG. 4B. Similarly, when the switch 58 is actuated, a 6-volt DC signal is produced at the input terminal 66 thus energizing the transistor 68 and 70 and their associated segments A, B, C and D, F, G to produce the digit 9 as illustrated in FIG. 4B. It will be noted that in the arrangement illustrated in FIG. 4A, as with the preferred embodiment of the invention to be hereinafter described, only one of the switches 54, 56 and 58 is to be actuated at any given time.

From the foregoing it will be seen that the respective zener voltages or breakdown voltages selected for the respective encoding diodes 60 and 62 and "decoding" diodes 74 and 76 are offset somewhat. This offset provides a margin of error of on the order of 2 volts, to substantially avoid any decoding errors due to noise or the like on the line CH. Accordingly, the decoded signals for driving the matrix comprising the diodes 51 reliably decodes three different DC signal levels into suitable signals for energizing only he segments of the display corresponding to the actuated switch 54, 56 or 58. Hence, a one-to-one correspondence is achieved between each of th switches 54, 56 and 58 and the combination of segments of the display 50 required to display these digits, using but a single transmission line CH.

Figure 5:
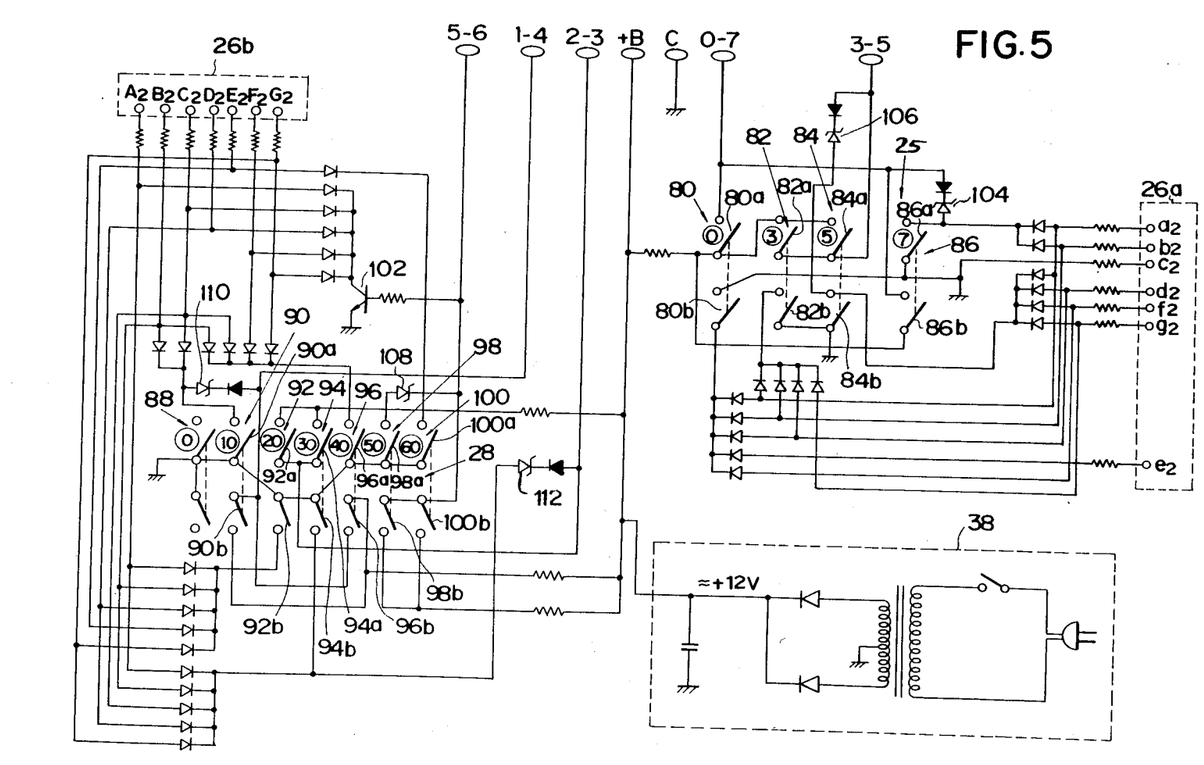
FIG. 5 is a circuit schematic diagram of a preferred embodiment of a control unit circuit in accordance with the invention.
Figure 6:
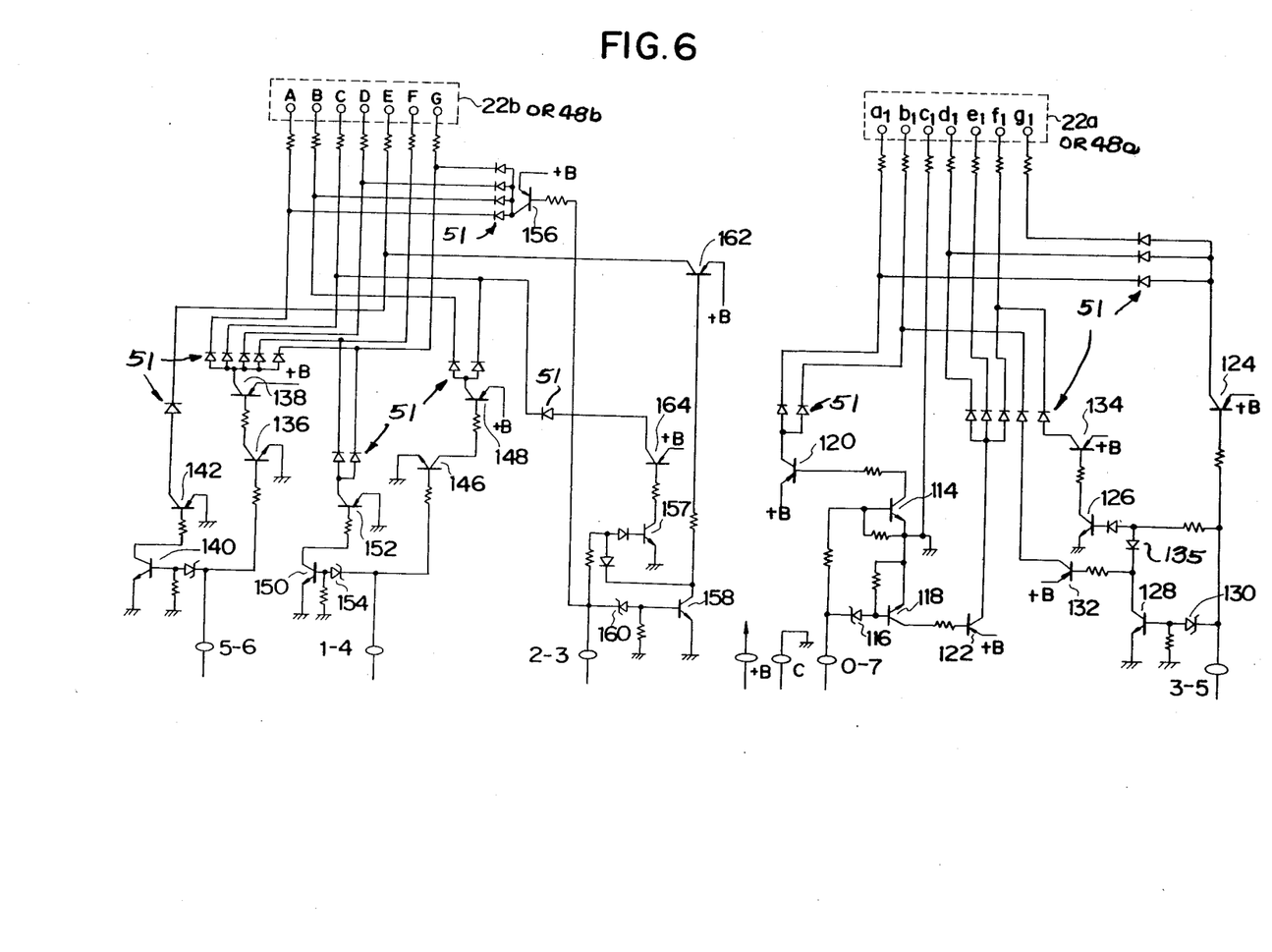
FIG. 6 is a circuit schematic diagram of a preferred embodiment of a display unit circuit according to the invention.

Reference is now invited to FIGS. 5 and 6 wherein the principles thus far described with reference to FIGS. 3 and 4 are utilized in a preferred embodiment of the invention.

Referring initially to FIG. 5, the encoding of DC voltage levels in response to actuation of respective ones of the pushbutton switches 25 and 28 is carried out in accordance with the principles illustrated in FIG. 3, that is, encoding two digits onto each transmission line or conductor. As will be seen later with reference to FIG. 6, the choice of the two digits to be encoded onto each conductor as described with reference to FIG. 3 simplifies the decoding thereof at the respective displays 22 and 48.

Additionally, as in the circuit of FIG. 4A, one of each pair of pushbutton switches 25 and 28 is provided with a suitable zener reference diode.

Referring first to the unit switches 25 at the right-hand side of FIG. 5, it will be seen that each of these switches comprises a double-pole, single-throw switch 80, 82, 84 and 86, corresponding to the digits 0, 3, 5 and 7 respectively. The respective poles of these switches are indicated by suffixes a and b, respectively. In FIG. 5, all of these switches 80, 82, 84 and 86 are shown in their unactuated condition. As mentioned above one and only one of the switches 25 and one and only one of the switches 28 may be actuated at a given time. This may be achieved with mechanical interlocking devices (not shown) if desired, or any other suitable means.

The units digit of the monitor display 26 associated with the units switches 25 is here designated by the suffix a and the respective segments thereof designated by a through g, together with the subscript 2. Similarly, the tens digit of the display 26 is here designated the reference numeral 26b and the segments thereof are designated A through G together with the subscript 2. This serves to differentiate these display segments from the similar display segments shown in FIG. 6 which are associated with the display units 16 and centralized monitoring and control unit 34, respectively.

A suitable +12 volt DC power supply 38 feeds the first movable contactor 80a of the "0" units switch 80. This +12 volts DC is also fed to the first terminal or pole 82a, 84a of the "3" and "5" units switches 82 and 84, respectively. The "0" units switch 80 when activated feeds the +12 volts DC to the 0-7 output terminal and associated transmission line or conductor by way of its first movable contactor 80a.

At the same time, the second movable contactor 80b thereof contacts ground, thereby placing a ground potential at the cathode electrodes of five diodes which form a part of a diode matrix. These five diodes are coupled for energizing the respective segments a, b, d, e and f of the units digit 26a of the monitor display 26. It will be noted that the c segment of the monitor units digit 26a is always coupled with ground and hence always energized. In this regard the displays 26a and 26b are seven-segment, common-anode LED displays.

With brief reference to FIG. 3 it will be seen that the foregoing segments a, b, c, d, e, f form the digit 0 on the monitor display. Consequently, a 12-volt DC signal at the output terminal 0-7 represents the digit 0.

Referring now to the "7" units switch 86, it will be seen that closing of the first movable contactor 86a thereof grounds the associated contact 86a thereof whereby a 5-volt zener reference or clampind diode 104 is placed in circuit with the output terminal 0-7. Hence, a 5-volt DC level on the terminal 0-7 represents the digit 7. Additionally, grounding of the contact 86a grounds the cathodes of two diodes of the matrix which energize the segments a and b of the units display 26a. As the segment c always remains energized, this forms the digit 7 on the units monitor display 26a.

The 3-5 output terminal carries one of two DC voltage levels in accordance with actuation of either the "3" units switch 82 or the "5" units switch 84. In this regard, a second 5-volt zener reference or clamping diode 106 is provided in circuit with the terminal 3-5 and the b portion of the switch 84 whose movable contactor 84b is grounded. In this regard, closing the first movable contactor 84a delivers the 12-volt DC power supply voltage to the terminal 3-5. Closing the contactor 84b completes the circuit to the zener diode 106 placing 5 volts DC on the output terminal 3-5 thereof. However, when the "3" units switch 82 is actuated the contactor 82a thereof selects the 12-volt DC supply voltage level to be fed to the output terminal 3-5. Closing of the switch 82b also energizes the segments a, b, d and g of the display element 26a, and since the segment c is always energized, this forms the digit 3. Similarly, the movable contactor 84b grounds the cathode electrodes of four diodes of the diode matrix for energizing the segments a, d, f and g of the units display element 26a to form the digit 5.

Referring now to the tens switches 28 in FIG. 5, a similar circuit arrangement is provided. Briefly, the tens switches comprise double pole, single throw switches 88, 90, 92, 94, 96, 98 and 100 with respective fixed and movable contacts thereof designated by suffixes a and b. Similar 5-volt zener reference or clamping diodes 108, 110 and 112 are provided for the respective three output terminals 5-6, 1-4 and 2-3 associated with the tens control switches 28. It will be apparent from the foregoing description that a similar internal diode matrix is utilized to energize the suitable segments to display related digits in the tens monitor display 26b in response to actuation of each of these switches 88, 90, etc. In one instance a transistor 102 is provided to isolate the diode matrix from the 5-6 output terminal. In operation, actuation of the "0" switch 88 effects reset of the unit as this switch has no circuit connections, but is merely mechanically coupled by suitable means (not shown) for de-activating the remaining switches 90, 92, etc.

In similar fashion to the circuit arrangement described previously, of the switch 90 causes the 5-volt DC signal from the zener reference 110 to be placed at the terminal 1-4. Hence this 5-volt DC level represents the tens digit 1. Similarly, acutation of the switch 92 places the 12-volt DC supply voltage at the associated output terminal 2-3 thus representing the tens digit 2. In like fashion, actuation of the switch 94 corresponding to the tens digit 3 shifts the voltage level at the output terminal 2-3 to 5 volts DC by switching the zener reference 112 into the circuit. The switch 96 associated with the tens digit 4 switches the 12-volt DC supply voltage to the 1-4 terminal. The switch 98 associated with the tens digit 5 places a 5-volt DC voltage on the terminal 5-6 by placing the zener reference 108 in circuit therewith, while the remaining switch 100 associated with the tens digit 6 places the 12-volt DC supply voltage on the terminal 5-6.

A decoding arrangement substantially similar to the simplified circuit arrangement of FIG. 4A is illustrated in FIG. 6 to which reference is now invited. Keeping in mind the foregoing voltage levels representing each of the units and tens digits produced by the circuit of FIG. 5, it will be seen that like-designated terminals 0-7 and 3-5 for the units and 5-6, 1-4 and 2-3 for the tens are reproduced in FIG. 6. Suitable cables or conductors of and length may be utilized to interconnect the like-designated terminals of FIGS. 5 and 6. The decoding arrangement illustrated in FIG. 6 may be utilized for both the display unit 16 and the centralized monitoring and control unit 34 of FIG. 1A without modification. Hence, the seven-segment displays illustrated in FIG. 6 are designated "22 or 48".

It will be useful at this point to recapitulate in tabular form the DC level encoding of the encoding circuits of FIG. 5 so that the DC levels at the various input terminals of FIG. 6 may be more readily determined for each possible combination of tens and unit digits:

TABLE I

| Content of signal to be transmitted | Output Line | Potential |
| --- | --- | --- |
| 0 in Unit position | 0-7 | 12 V |
| 3 in Unit position | 3-5 | 12 V |
| 5 in Unit position | 3-5 | 5 V |
| 7 in Unit position | 0-7 | 5 V |
| 1 in tens position | 1-4 | 5 V |
| 2 in tens position | 2-3 | 12 V |
| 3 in tens position | 2-3 | 5 V |
| 4 in tens position | 1-4 | 12 V |
| 5 in tens position | 5-6 | 5 V |
| 6 in tens position | 5-6 | 12 V |

Referring now to the display digit 22a or 48a which represents the units display of either the display unit 16 or the central monitoring unit 34, the principles of operation of the encoding circuits illustrated in FIG. 6 will be briefly described. The 0-7 input terminal feeds a circuit comprising the base electrodes of a pair of grounded emitter switching transistors 114 and 118. The base electrode of the transistor 114 is coupled by way of a suitable current limiting resistor to the terminal 0-7 while a zener diode 116 having a reverse breakdown voltage of 8 volts is placed in reverse polarity intermediate the terminal 0-7 and the base electrode of the transistor 118. Accordingly, the 12-volt signal representing the units digit 0 will energize both transistors 114 and 116 while the 5-volt signal representing the units digit 7 will energize only the transistor 114.

The transistor 114 is coupled to two diodes of a diode matrix for energizing the a and b segments of the units display 22a or 48a by way of an additional suitable switching transistor 120. Briefly, in the embodiment of FIG. 6 the display elements 22a, 22b or 48a, 48b are seven-segment common cathode LED display elements. Hence, to energize the segments of these displays, a positive supply voltage, which may comprise the 12-volt DC voltage from the power supply 38 of FIG. 5, must be applied thereto. Accordingly, the transistor 114 has its collector electrode coupled to the base electrode of a PNP transistor 120 having the B+ supply at its emitter electrode. The collector electrode of this PNP transistor 120 is coupled to the anode electrode of two diodes of the diode matrix 51 whose cathode electrodes are coupled to suitable current limiting resistors to the a and b segments of the units digit display 22a or 48a. Hence, upon energization of the transistor 114 the a and b segments will be energized or activated. It will be noted that the c segment of the display 22a or 48a is fed the +B supply voltage at all times whereby it remains in an active or energized condition at all times.

Similarly, the transistor 118a is coupled for selectively turning on a second PNP transistor 122 which carries the B+ at its emitter electrode. The collector electrode of the transistor 122 drives to a second portion of the diode matrix 51 comprising three diodes coupled with the d, e and f segments of the display 22a or 48a. Hence, the 12-volt DC signal representing the unit digit 0 at the 0-7 terminal will energize both transistors 114 and 118 thereby energizing segments a, b, c, d, e and f of the display 22a or 48a to form the digit 0 as shown in FIG. 3.

In similar fashion, the 3-5 terminal feeds grounded emitter NPN switching transistors 126 and 128, the latter transistor 128 being provided with a reverse biased zener diode 130 having a breakdown voltage of 8 volts DC. The transistor 126 energizes the f segment in response to 5 volts DDC on the 3-5 input, by way of a PNP transistor 134 and an associated diode of the diode matrix 51. Additionally, either of the 12 volt or 5 volt signals on the 3-5 terminal directly energizes segments a, d and g of the display 22a by way of a PNP transistor 124 and three associated diodes of the diode matrix. It will be noted that each of the transistors 124 and 134 carries the B+ on its emitter electrode for energizing the associated segments of the display 22a. An additional diode 135 is provided between the base circuit of transistor 126 and the collector circuit of the transistor 128 for turning off the transistor 126 and hence the f segment when the transistor 128 is turned on by 12 volts DC at the 3-5 input. Similarly, turning on this second transistor 128 turns on a further PNP transistor 132 which energizes the b segment. Hence, the digit 5 is changed to the digit 3 when the 12 volt DC signal replaces 5 volts DC at the 3-5 terminal.

Referring briefly to the tens digit display 22b or 34b at the left-hand portion of FIG. 6, it will be seen that a substantially similar circuit arrangement is utilized with respect to the three input terminals 5-6, 1-4 and 2-3. In this regard suitable switching transistors 136, 140 (NPN) and 138, (PNP) 142 are associated with the 5-6 terminal and with diodes in a matrix for selectively energizing the appropriate segments of the display 22b or 48b to display one of the digits 5 or 6 in this tens display. A reverse biased zener diode 143 (8 volts breakdown voltage) is provided in the base circuit of the switching transistor 140. Hence, this transistor 140 is turned on only in response to the 12-volt DC encoded voltage on the input 5-6 representing the tens digit 6. This turns on the PNP transistor 142 for energizing the required additional segment e to form the digit 6 in the display 22b or 48b.

In similar fashion the 1-4 terminal is provided with switching transistors 146, 150 (NPN) and 148, 152 (PNP) and an 8-volt breakdown zener diode 154 all coupled with the diode matrix 51 for energizing the appropriate segments of the display 22b or 48b to form either the digit 1 or 4 in response to either a 5-volt or 12-volt DC level on the input terminal 1-4.

Finally, the 2-3 terminal feeds a similar network comprising switching transistors 157, 158, (NPN) 162, 164 and 156 (PNP) and a zener diode 160 having a reverse breakdown voltage of 8 volts, which network is coupled with the diode matrix 51 for energizing appropriate ones of the segments a through g of the display 22b or 48b to display one of the digits 2 or 3 therein depending upon the encoded DC voltage level 12 volts or 5 volts presented at the terminal 2-3. This latter network is similar in structure and operation to the circuit described above for the units display 3-5 input.

While particular embodiments of the invention have been shown and described in detail, it will be obvious to those skilled in the art that changes and modifications of the present invention, in its various aspects, may be made without departing from the invention in its broader aspects, some of which changes and modifications being matters of routine engineering or design, and others being apparent only after study. As such, the scope of the invention should not be limited by the particular embodiment and specific construction described herein but should be defined by the appended claims and equivalents thereof. Accordingly, the aim in the appended claims is to cover all such changes and modifications as fall within the true spirit and scope of the invention.

The invention is claimed as follows:

1. A system for transmitting data from at least one control position to a remote display position for controlling a display comprising at least one seven-segment display character at said remote display position, said system comprising: a plurality of data transmission lines coupled between said control position and said display position, said data transmission lines being fewer in number than the number of display segments to be controlled thereby; DC voltage level encoding means at said control position comprising for each transmission line, at least one switch coupled across a DC supply voltage and at least one first zener diode in series circuit with said at least one switch for clamping said DC supply voltage to the zener voltage thereof when the switch is actuated thereby encoding at least two data into corresponding DC voltage levels; and decoding means for each said transmission line located at said display position, each said decoding means including at least one second zener diode having a zener voltage intermediate the DC supply voltage and the zener voltage of the at least one first zener diode, said decoding means being coupled between said transmission line and at least two different groups of said display segments, each group comprising at least one of said display segments, for decoding each of the DC voltage levels produced by said encoding means and received over said transmission line into a corresponding signal for energizing a corresponding one of said groups of display segments, whereby at least two different data for energizing at least two different corresponding groups of display segments of said at least one display character may be transmitted over each transmission line.

2. A system according to claim 1 wherein said decoding means further comprises a switching element intermediate each of said second zener diodes and one of said groups of said display segments.

3. A system according to claim 2 wherein said decoding means further comprises decoding matrix means intermediate each of said switching elements and the segments of each group for energizing the segments corresponding to each of said data.

4. A system according to claim 1 wherein said display comprises a pair of seven-segment alphanumeric display characters, one of said display characters representing tens and the other representing units.

5. A system according to claim 4 wherein at least one of said transmission lines, at least one of said encoding means and at least one of said decoding means are associated with each of said seven-segment alphanumeric display characters.

* * * * *